(12) United States Patent
Carli

(10) Patent No.: US 6,436,293 B1
(45) Date of Patent: Aug. 20, 2002

(54) WATER SOFTENER DEVICE FOR REDUCING WATER HARDNESS HAVING A RESINS EXHAUSTION SENSOR AND MANUFACTURING METHOD THEREOF

(75) Inventor: Carlo Carli, Tradate (IT)

(73) Assignee: T & P S.p.A., Tradate (IT)

( * ) Notice: Subject to any disclaimer, the term of this patent is extended or adjusted under 35 U.S.C. 154(b) by 0 days.

(21) Appl. No.: 09/537,011

(22) Filed: Mar. 28, 2000

(30) Foreign Application Priority Data

Mar. 30, 1999 (IT) .......................................... TO99A248

(51) Int. Cl.$^7$ .................................................. C02F 1/42
(52) U.S. Cl. ........................ 210/661; 210/739; 210/746; 210/91
(58) Field of Search ................................ 210/661, 670, 210/696, 709, 739, 746, 85, 91, 103, 190

(56) References Cited

U.S. PATENT DOCUMENTS

| | | | | |
|---|---|---|---|---|
| 3,172,037 A | * | 3/1965 | Pfeiffer | |
| 3,618,769 A | * | 11/1971 | Iglesias | 210/96 |
| 3,869,382 A | * | 3/1975 | Tejeda | 210/85 |
| 4,320,010 A | * | 3/1982 | Tucci et al. | 210/96.1 |
| 4,431,533 A | * | 2/1984 | Wrede | 210/87 |
| 5,234,601 A | * | 8/1993 | Janlee et al. | 210/662 |

\* cited by examiner

Primary Examiner—Robert J. Popovics
(74) Attorney, Agent, or Firm—Levine & Mandelbaum

(57) ABSTRACT

A device for reducing water hardness suitable for the use in a household washing machine, in particular a dishwasher, comprising a container within which ionic exchange resins are housed, which provide to reduce the hardness degree of the water lapping them and means for regenerating the softening efficiency of said resins, wherein at least a portion of said resins are contained in a delimited space, a wall of said space comprises a movable or elastic element, means are provided for detecting the movement of said movable or elastic element.

33 Claims, 2 Drawing Sheets

WATER SOFTENER DEVICE FOR REDUCING WATER HARDNESS HAVING A RESINS EXHAUSTION SENSOR AND MANUFACTURING METHOD THEREOF

BACKGROUND OF THE INVENTION

The present invention relates to a softener device for reducing water hardness, suitable for utilization in a household washing machine, in particular a dishwasher, and a relevant manufacturing method thereof.

As known, the household washing machines making use of water, in particular dishwashers, are equipped with a device for decalcifying of the washing and rinsing water, which is provided for reducing water hardness and avoid calcareous deposits. Such a device is also known as a water softener.

As known, the calcareous deposit is the result of a remarkable amount of calcium (Ca++) and magnesium (Mg++) ions contained in the wash water and from the heating produced inside the machine during washing.

Therefore, the decalcifier provides for exchanging the calcium (Ca++) and magnesium (Mg++) ions of the water entering in the wash tub with sodium ions (Na+) contained in appropriate resins, placed in the decalcifier.

The resins, or other similar matter, hereafter called resins for simplicity's sake, become exhausted after a certain time of usage, i.e. they release their sodium ions (Na+) to be exchanged with the calcium (Ca++) and magnesium (Mg++) ions of the water; therefore when the resins are exhausted, the water flowing through the latter substantially maintain the same hardness as it had at the inlet.

The higher is the water hardness degree, the faster resin exhaustion will occur.

A regeneration stage of the resins is performed to avoid this drawback; this consists in introducing a water and salt solution (NaCl) in the resins container.

This stage is usually executed for every wash cycle, with a considerable quantity waste of salt, to be often introduced by the user; moreover, a higher water consumption is also required.

Is known that to reduce salt and water wastage, some washing machines are currently equipped with water hardness sensors, which enabling resins regeneration only upon detecting a reduction of water hardness below a certain threshold following their exhaustion.

Said sensors usually measure water resistivity and, from the results obtained, a control system will either enable or not resins regeneration.

According to this system electrodes have to be immersed in water and electrically supplied. Even in case of a low voltage being applied to the sensors, this will always entail a risk, since the sensors are in direct contact with water.

Even if a water hardness reduction is performed regularly, nothing will hinder that a light calcareous layer may deposit on the sensors, before regeneration is started, thus altering water hardness detection due to an additional calcareous resistivity.

Moreover, these systems detect water hardness directly, whereas the resin status only indirectly; as a result, the resins regeneration will be activated also in those instances where it is not yet required.

SUMMARY OF THE INVENTION

It is the aim of the present invention to solve the above drawbacks and provide, in particular a water softener device for reducing water hardness, which is suitable for the use in a household washing machine, in particular a dishwasher, wherein the detection of the exhaustion of the reducing means can be realized in a simple, easy, safe, cheaper and direct way.

Another aim of the present invention is to provide a method for detecting exhaustion of the ionic exchange resins, which is a safe and advantageous method.

Another aim of the present invention is to provide an advantageous manufacturing method of such a device for reducing water hardness.

In order to achieve such aims, it is the object of the present invention to provide a device for reducing water hardness, a detecting method of resins exhaustion and a manufacturing method of a device for reducing water hardness, having the features of the annexed claims, which form an integral part of the present invention.

Further aims, features and advantages of the present invention will become apparent from the following detailed description and annexed drawings, which are supplied by way of non limiting example, wherein:

DESCRIPTION OF THE PREFERRED EMBODIMENT

Figure 1:
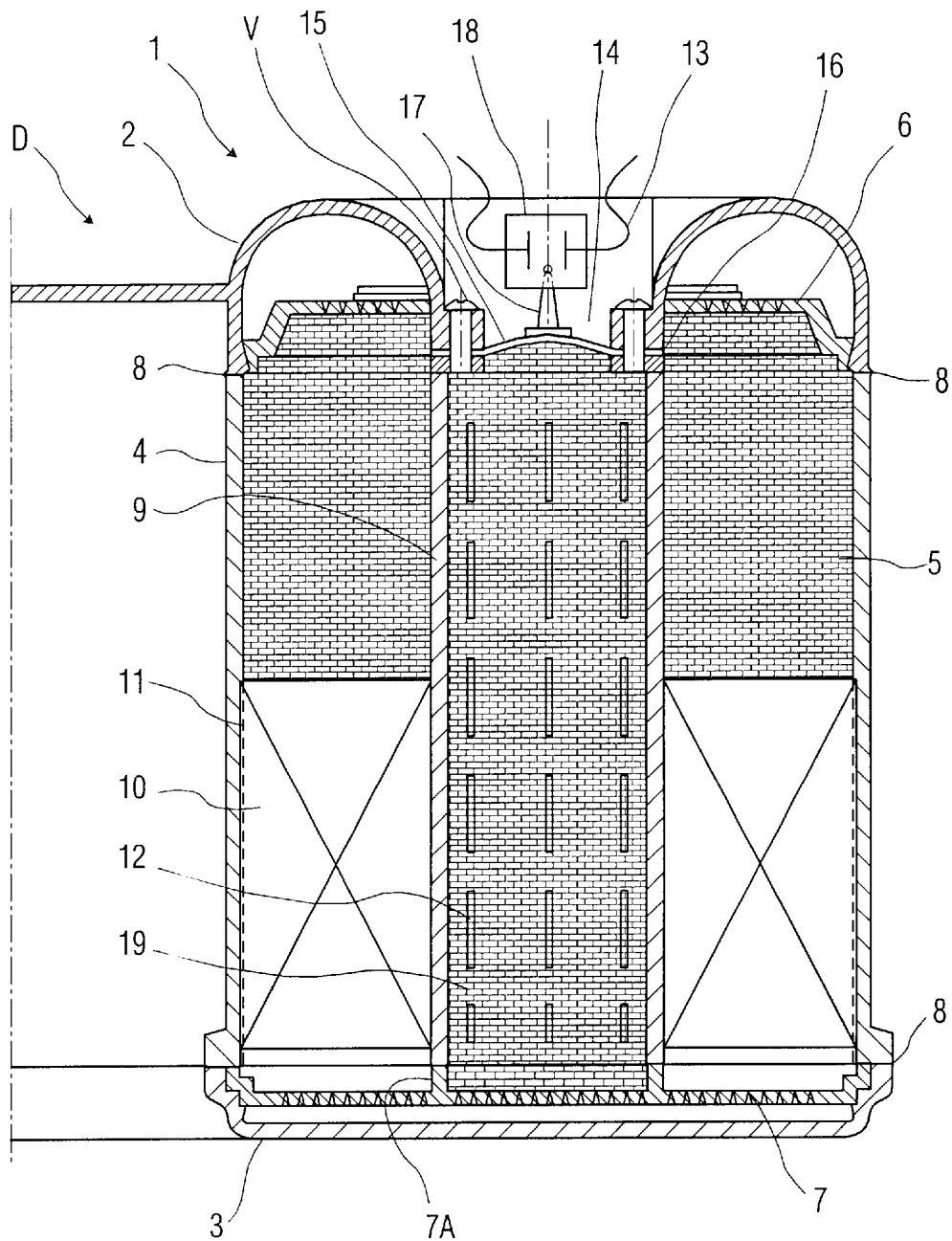
FIG. 1 shows schematically a vertical section of a resins container of a device for reducing water hardness according to the present invention.
Figure 2:
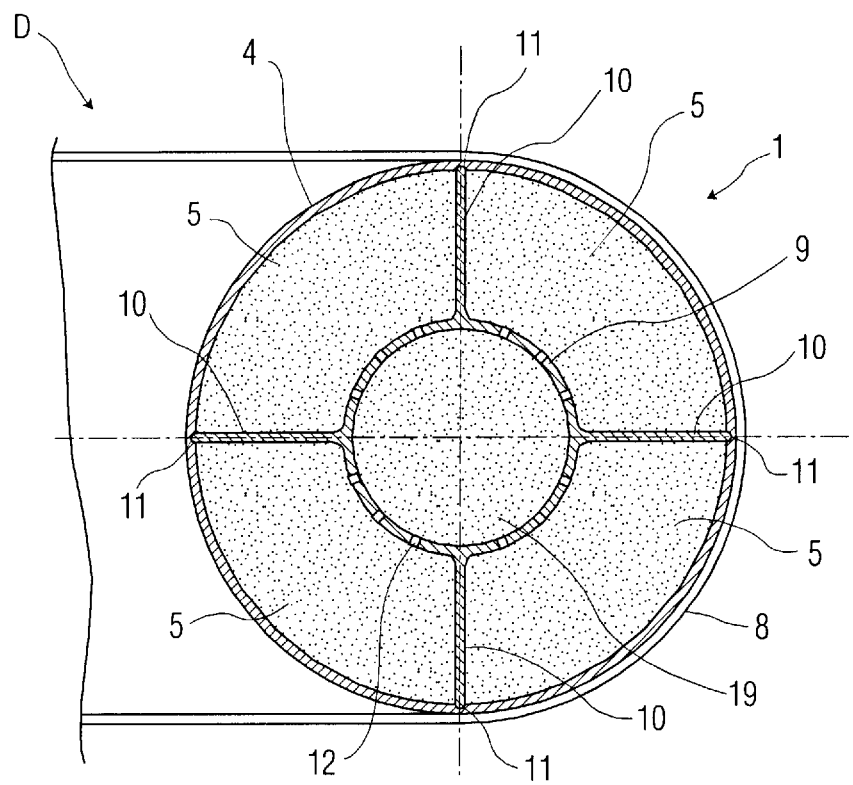
FIG. 2 shows schematically a cross section of a resins container of a device for reducing water hardness according to the present invention.

In FIGS. 1 and 2, showing schematically a vertical section and cross section of a resins container, respectively, of a device for reducing water hardness according to the present invention, reference 1 indicates a resin container, which is mechanically and hydraulically connected to a salt container as required for resins regeneration, not shown in the drawings, both of them being part of a device D for reducing water hardness.

The softener D consists of three parts, which are hot-blade welded to each other after having inserted the various components inside them; with reference 2 is indicated an upper lid of the softener D, with reference 3 its lower portion, with reference 4 its main central portion and with reference 5 the water softening resins.

References 6 and 7 indicate an upper filter and a lower filter, respectively; reference 8 indicates the weld spot of all three parts forming the softener D.

Reference 9 indicates a cylindrical hollow column, or similar tubular element, suitable to be centrally inserted from the bottom, in the resins container 1 before being welded to its respective lower wall 3.

An end of the column 9 is closed by the portion of the filter 7 delimited by a projection 7A on the filter itself; the projection 7A, whose section has the same dimensions and shape of the section of column 9, will be welded to the lower edge of the column 9, when the lower portion 3 is welded to the main central part 4 of the softener D.

Moreover, the column 9 has a set of ribs 10 (at least three) departing radially from the external surface of the column itself.

The ribs 10 have a height equal to about half the height of the column 9 and such a width to be inserted in special grooves 11 formed on the internal surface of the container 1 (see FIG. 2 in particular); thus, the column 9 is inserted in the middle and positioned correctly inside the container itself.

The height position of the column 9 inside the container 1 is delimited by the stop to the insertion of the ribs 10 in the grooves 11 due to the height size of the latter, said height position striking on the upper end of the grooves themselves.

Moreover, the column 9 has slits 12 on both the external wall and bottom, which are able to hydraulically connect the inside portion of the column 9 with the container 1.

The lid 2 of the container 1 delimits a central area 13, whose bottom has an opening 14 in line with the column 9.

Reference 15 indicates an elastic membrane fastened to the lid 2, so as to close the above opening 14.

In order to fasten the elastic membrane 15 in position, its peripheral edges are interposed between the lid 2 and a ring 16, the latter being fastened to the lid 2 by means of screws V.

The ring 16, besides maintaining the spring membrane 15 in position, is used for welding the edges of the opening 14 to the column 9, to avoid damaging the elastic membrane 15.

Reference 17 indicates an activation element shaped like a ferrule, which is assembled on a central position of the membrane 15 and integral with it.

The ferrule is made of dielectric material and as explained hereafter, it is able to move with the membrane 15 between the parallel plates of a capacitive sensor 18.

Reference 19 indicates of the sample resins available in the column 9, which are similar to the resins contained in the container 1; according to the present invention, such sample resins are appropriately treated for their insertion in the column 9, according to procedures further described hereafter.

The present invention is based on the acknowledgement of two considerations as follows.

A first consideration is based on the principle that the normal resins utilized for reducing water hardness tend to change their volume following their exhaustion, which is a phenomenon occurring during normal operation of the softening device.

A second consideration, reached by the authors of the present invention, is based on the principle that their volume can also be changed under particular concentrating conditions of the sodium ions (Na+) in the water solution surrounding them.

Such a phenomenon is explained by the resins configuration and composition.

Quite schematically, the resins consist of granules or tiny pearls, each one of them formed by a structure of polystyrene chains, substantially enwrapped to each other as a clew.

The various polystyrene chains are tied to each other by means of smaller di-vinyl-benzene chains, on which are present sites ($SO_4-$) where ions can reside.

It has been ascertained by the inventor that the polystyrene structure of the tiny resin pearls forms a substantially semi-permeable membrane, which is able to let enter a portion of Na+ ions present in the water-salt solution surrounding it; also the remaining portion of ions Na+ outside the membrane tends to enter in the structure due to osmotic pressure, but in vain.

The remaining portion of ions Na+ unable to enter in the structure of the resin pearl, the osmotic pressure exerted by the above ions Na+ on the said membrane, it will compress the pearl and reduce its volume.

In other words, if a small virgin resin pearl is immersed in a water solution with a high sodium chloride concentration (NaCl), a portion of sodium ions Na+ of such a solution will enter the pearl structure due to the osmotic pressure being exerted, whereas the remaining portion of sodium ions Na+ outside the pearl, being unable to enter the structure of the pearl, will compress it and consequently reduce its volume, due to the osmotic pressure exerted on the external surface of the resin pearl.

Just indicatively, a volume reduction of about 10–11% has been ascertained for a water solution containing 100 g/l sodium chloride.

When the resins are in their natural or virgin state, they already contain sodium ions (NA+) to be exchanged with the calcium ions (Ca++) and magnesium ions (Mg++) contained in the wash water.

Therefore, according to the present invention, the preparation of the sample resins to be inserted in the column 9, which represent a sensing means of the resins status along with the membrane 15, ferrule 17 and capacitive sensor 18, occurs in the follow manner.

Sample resins 19, before being inserted in the column 9, are immersed in a water solution saturated with sodium chloride (NaCl), so as to reduce their volume as previously described.

Thus, through utilization of the osmotic pressure, the amount of resins that can be inserted in the column 9 will be higher compared to the amount of untreated resins that may be inserted in it.

Then the column 9 is inserted in the central portion 4 of the container 1, inserting the ribs 10 in the relevant grooves 11.

After this operation the bottom 3 is welded to the container body 4 with the relevant filter 7, as currently known.

Through the welding of the bottom 3 to the container body 4, also the projection 7A of the filter 7 is welded to the lower edge of the column 9, thus closing the lower section of the column 9.

The elastic membrane 15 is then fastened to the lid 2, in line with the opening 14 of its central area 13; to obtain this fastening the peripheral edges of the membrane 15 are interposed between the lid 2 (along the edge of the opening 14) and the ring 16; then the screws V are tightened.

The column 9 is then filled with the resins treated to have a reduced volume according to the method previously described; at this point, in the body 4 equipped of the bottom 3 and the column 9, standard untreated softening resins are introduced.

Thereafter, the filter 6 is placed on the upper portion of the body 4 and, finally, the lid 2 will be welded.

Now the resins are washed with softened water with a low contents of calcium and magnesium; thus, the high sodium concentration (Na+) on the external pearls surface is removed from the sample resins 19 contained in the column 9.

Thus, the osmotic pressure exerted on the pearls by the sodium ions (Na+) will lack and the latter can go back to their original volume.

Therefore, through their volume increase the sample resins 19 cause a thrust inside the column 9, which can only extend upwards, since the lower section is closed by the filter portion 7 delimited by the projection 7A, causing a consequent distortion of the membrane 15 and a lifting of the ferrule 17 associated to it.

Now the sensor 18, which is able to detect a volume change of the resins as further described, is calibrated to this purpose according to currently known procedures.

As the resins become gradually exhausted during the use of the decalcifier on the washing machine, loosing their own sodium ions (Na+) and taking calcium ions (Ca++) and magnesium ions (Mg++) contained in the wash water, they will reduce their volume.

This volume reduction, which is about 7%, occurs both for the resins of the container 1 and for the sample resins 19 contained in the column 9, by virtue of the slits 12, which let the wash water flow through; a volume reduction of the latter causes the pressure exerted on the membrane 15 to be reduced; therefore the membrane can flexibly lower itself following the volume reduction of the sample resins.

To the membrane 15, as previously described, is connected the ferrule of dielectric material 17, which is movable between the plates of the capacitive sensor 18.

The capacitive sensor 18 is connected to a suitable control system, not described as being currently known, which detects the capacity change depending on the position of the ferrule 17 between the plates of the sensor 18.

Depending on the capacity value detected, i.e. when such a capacity goes below a certain determinate threshold corresponding to a certain condition of exhausted resins, the control system will start resins regeneration, which occurs according to currently known procedures.

This regeneration stage, which consists substantially in supplying a water-salt solution to the container 1, obviously also concerns the sample resins 19, by virtue of the slits 12.

The capacitive sensor 18 is calibrated, for example, to have resins regeneration started when resins exhaustion has reached about 70%, which equals a well determined position of the ferrule 17 between the plates of the sensor 18.

Thus, resins regeneration will only occurs when strictly required, avoiding both water and salt wastage.

Moreover, the resins will never reach a complete exhaustion, with the risk of using a water too hard for washing.

It should be appreciated than, in order of a normal resins regeneration effected in the washing machine, the resins of the container 1 (including resins 19) are immersed in a water-salt solution; such a solution has a surely lower concentration of sodium ions Na+ than the solution used for the preventive treatment of the sample resins; this does not hinder that also this usual regeneration stage may cause a reduction of the resins volume, always by virtue of a certain osmotic pressure being exerted.

However, it should be considered that a regeneration process provided on common washing machines provides a final resins wash stage, following which they can go back again to their original volume.

In this frame, therefore, the control system of the washing machine will be prearranged to have the sensor 18 inhibited during the regeneration process.

According to the above description, the features of the present invention are clear.

According to the above description also the advantages of the present invention will be clear.

In this connection it will be appreciated how the resins 19 contained in the column 9 not only perform their function of detecting the efficiency status of the softening device, but along with the sensor 18, they also contribute to the softening of the wash water. The regeneration quality is not affected by the quantity of sample resins 19, since whatever their quantity will be, they are always utilized for regeneration purposes. Such a solution permit to limit the overall dimensions of the resins container, since an external container for the sample resins is not required.

As it can be seen from the above description, both the system and detection method of resins exhaustion in a washing machine are simple, not bulky and easy to achieve.

Moreover, the device offers a high operating reliability, since resins exhaustion is detected by direct monitoring, i.e. without keeping water hardness under control, in which case the exhaustion degree of the resins themselves can only be deduced indirectly.

The fact that the resins container includes also a container recess for sample resins, produces a further operating efficiency of the device. In fact, during operation both the decalcifying resins and sample resins are in a condition of being submitted to the same water temperature and pressure conditions, thus bringing the resins exhaustion signal obtained by the sample resins nearer to reality.

Also the easy replacement of a likely faulty sensor, which is assembled outside the resins container 1, improves the technical features of the softening device.

It is obvious that many changes are possible for the man skilled in the art to the device and method object of the present invention, without departing from the novelty spirit of the inventive idea.

According to a first possible embodiment, an electric microswitch could be used instead of a capacitive sensor 18.

Figure 3:
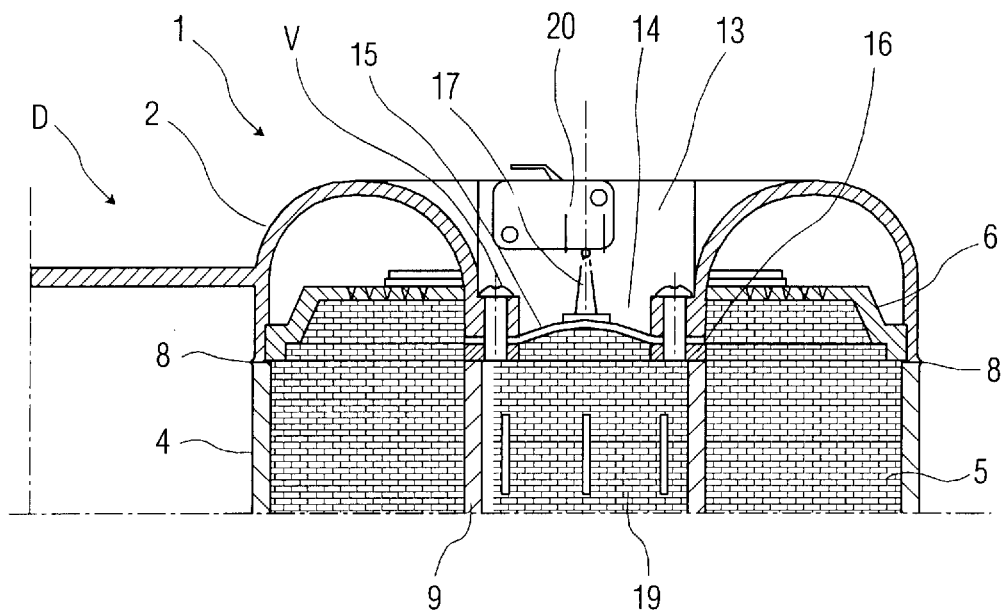
FIG. 3 shows schematically a vertical section of the upper portion of a resins container of a device for reducing water hardness according to an embodiment of the present invention.

This embodiment is represented in FIG. 3, where said microswitch is indicated with reference 20.

In this instance the ferrule 17 operates on the microswitch 20, whose switching can be utilized by the control system as a principle for enabling the start of a regeneration process; another implementation, in particular in the instance of washing machines with an electromechanical control system, consists in incorporating the microswitch 20 in the supply circuit of the solenoid valve for water intake control to the salt container; under normal conditions, the microswitch 20 will maintain the circuit open to hinder the opening of said solenoid valve and consequent execution of the regeneration stage; under conditions of exhausted resins, vice-versa, a switching of the microswitch 20 will cause the closure of the supply circuit of said solenoid valve to let water intake in the salt container, with a consequent supply of the regeneration solution (water-salt) to the container 1.

It is obvious, anyway, for the man skilled in the art, that in this frame various implementations to the invention are possible, both for machines with an electronic control system and machines with an electromechanical control system.

An implementation could eventually consist in replacing the membrane 15 with a suitable movable sealing element.

Another implementation for detecting a change of the resins volume may consist in using an optical sensor, such as a phototransistor, detecting the position of the ferrule 17.

In view of obtaining an advantageous implementation of the invention, the system may also be applied for detecting and signalling a lack of salt in the softener D.

The float system, which is typical of the current art, is sufficiently reliable in causing a warning light to go off after salt refilling of the respective container by the user; vice-versa, such a float system is often a very rough system in signalling a lack of salt.

The basic idea of the suggested implementation is to utilize the information related to a volume change of the resins for determining a lack of salt. In fact, the resins volume is also tied to a good operation of the brine used for resins regeneration.

In fact, if after having started regeneration because the sample resins 19 have reached a certain exhaustion degree, the sensor detects at regeneration end that the resins volume has not gone back to its predetermined value, this means that the brine used has not enough salt concentration for a good regeneration.

Therefore, in such an event, the control system of the machine may be provided for activating a warning light, which is able to warn the user about the need of adding salt in the relevant container. In this manner, the signal for salt refilling is safe, simple and reliable.

In this frame, the detection method described will also perform the function of signaling likely faults of the regeneration system.

It is obvious, in fact, how in spite of a sufficient volume of salt in the relevant container, activation of said warning light is indicative of a wrong operation of the system, such as a fault of the solenoid valve activating the regeneration process.

According to a further possible embodiment, the state of the sensor 18 may be utilized for controlling the duration time of the regeneration process.

In fact, if following activating a resins regeneration because the sample resins 19 have reached a certain exhaustion degree, the sensor will detect before the end of the regeneration stage that the volume of the sample resins has gone back to its predetermined value, the control system of the machine can be provided for stopping such a regeneration stage. Thus, stopping the regeneration stage will mean a saving of water and salt.

What is claimed is:

1. A device for reducing water hardness suitable for the use in a household washing machine comprising a container within which ionic exchange resins are housed, which provide for reducing the hardness degree of the water lapping them and means for generating the softening efficiency of said resins, wherein:
   at least a portion of said resins are contained in a delimited space,
   a wall of said space comprises a movable or elastic element, and
   means are provided for detecting the movement of said movable or elastic element.

2. A device according to claim 1, wherein said space is delimited inside said container and is communicating with the environment surrounding it.

3. A device according to claim 1, wherein said space is surrounded by a tubular element closed at least on one end.

4. A device according to claim 3, wherein said tubular element is at least partially surrounded by ionic exchange resins.

5. A device according to claim 3, wherein said tubular element is centrally inserted in the resins container.

6. A device according to claim 3, wherein at least under one operating condition of the device, said tubular element is completely filled with said portion of resins.

7. A device according to claim 6, wherein said portion of resins is compressed.

8. A device according to claim 3, further comprising means for positioning said tubular element within said container.

9. A device according to claim 8, wherein said, positioning means comprises external ribs of said tubular element, which are adapted for coupling in seats delimited in the body said container on internal walls of the latter.

10. A device according to claim 3, wherein the lower portion of said tubular element is closed by a projection present on a filter.

11. A device according to claim 3, wherein said tubular element is communicating with said container through slits present on its external wall and on the bottom.

12. A device according to claim 1, wherein said detection means comprises an activation element movable with said elastic element.

13. A device according to claim 12, wherein said activation element is a ferrule.

14. A device according to claim 12, wherein said detecting means comprises a sensor able to detect a displacement of said activation element.

15. A device according to claim 14, wherein said sensor is a capacitance sensor.

16. A device according to claim 1, wherein said movable or elastic element comprises an elastic membrane.

17. A device according to claim 16, wherein said movable or elastic element is able to change its own shape in response to a thrust caused by a volume change of said portion of resins confined in said tubular element.

18. A device according to claim 11, wherein said movable or elastic element is fastened to a lid of said container, the edges of said movable or elastic element being interposed between a ring and said lid.

19. A device according to claim 1, wherein detecting means are used in order to detect an exhaustion of the resins operating efficiency.

20. A device according to claim 1, wherein said detecting means are used for the control of signalling means for signalling a lack of salt in the regeneration system of said resins and/or a fault of said system.

21. A device for reducing water hardness suitable for the use in a household washing machine comprising a container within which ionic exchange resins are housed, which provide for reducing the hardness degree of the water lapping them and means for generating the softening efficiency of said resins, whereinat least a first portion of resins is contained in a space delimited inside said container, said delimited space communicating with the water to be softened, and that there are provided means to detect a volume change of at least said first portion of resins, in order to know the operating status of said resins.

22. A device for reducing water hardness suitable for the use in a household washing machine comprising a container within which ionic exchange resins are housed, which provide for reducing the hardness degree of the water lapping them and means for regenerating the softening efficiency of said resins, wherein at least a first portion of resins is contained in a space delimited inside said container, said space being surrounded by a second portion of resins, said delimited space communicating with the surrounding portion of said container containing said second portion of resins, that said first portion of resins performs a substantial softening action of the water along with said second portion of resins, and that means are provided to detect a volume change of said first portion of resins, in order to know the operating status of said resins.

23. A method of controlling the degree of exhaustion of water softening resins in a household washing machine using regeneration resins, comprising detecting a volume change of the resins lapped by the water to be softened, in order to detect the exhaustion degree of the softening power of the resins and/or a lack of salt in the regeneration system of said resins and/or a fault of the water softening system.

24. A control method according to claim 23, wherein said resins are compressed before being introduced in said delimited space.

25. A control method according to claim 24, wherein said resins are compressed by immersing the resins in their virgin state in a solution saturated with sodium chloride (NaCl).

26. A control method according to claim 25, wherein said resins are submitted to a wash treatment with softened water.

27. A method according to claim 23, wherein if the resins volume does not reach a preset threshold following a regeneration stage, signalling means are enabled for adding salt for regeneration of the resins.

28. A method according to claim 23, wherein if the resins volume does not reach a preset threshold following a regeneration stage, means signalling a fault in the regeneration systems is enabled.

29. A method of controlling the degree of exhaustion of water softening resins in a household washing machine using regeneration resins, comprising detecting a change of the position and/or configuration of a movable or elastic element delimiting at least partially a recess containing said resins, said change of position and/or configuration of said movable or elastic element being determined by a volume change of said resins, which indicates the degree of exhaustion of the softening power of said resins.

30. A control method according to claim 29, wherein the change of position of said movable or elastic element is detected through a sensor means responsive to it.

31. A method according to claim 30, wherein the regeneration process has a time duration controlled by said sensor means.

32. A control method according to claim 29, wherein said sample resins are contained in a tubular element column inserted centrally in the container.

33. A method for detecting the exhaustion degree of the softening efficiency of resins in a washing machine using regeneration resins, comprising providing for the detection of a volume change of at least a portion of said resins through a change of the position of an element delimiting at least partially a recess containing said resins.

* * * * *